2 Sheets--Sheet 1

J. HOLLINGSWORTH.
Horse Hay Rake.

No. 167,533. Patented Sept. 7, 1875.

WITNESSES
Henry N. Miller
C. L. Eiserh.

INVENTOR
James Hollingsworth
per
Alexander Mason
ATTORNEYS

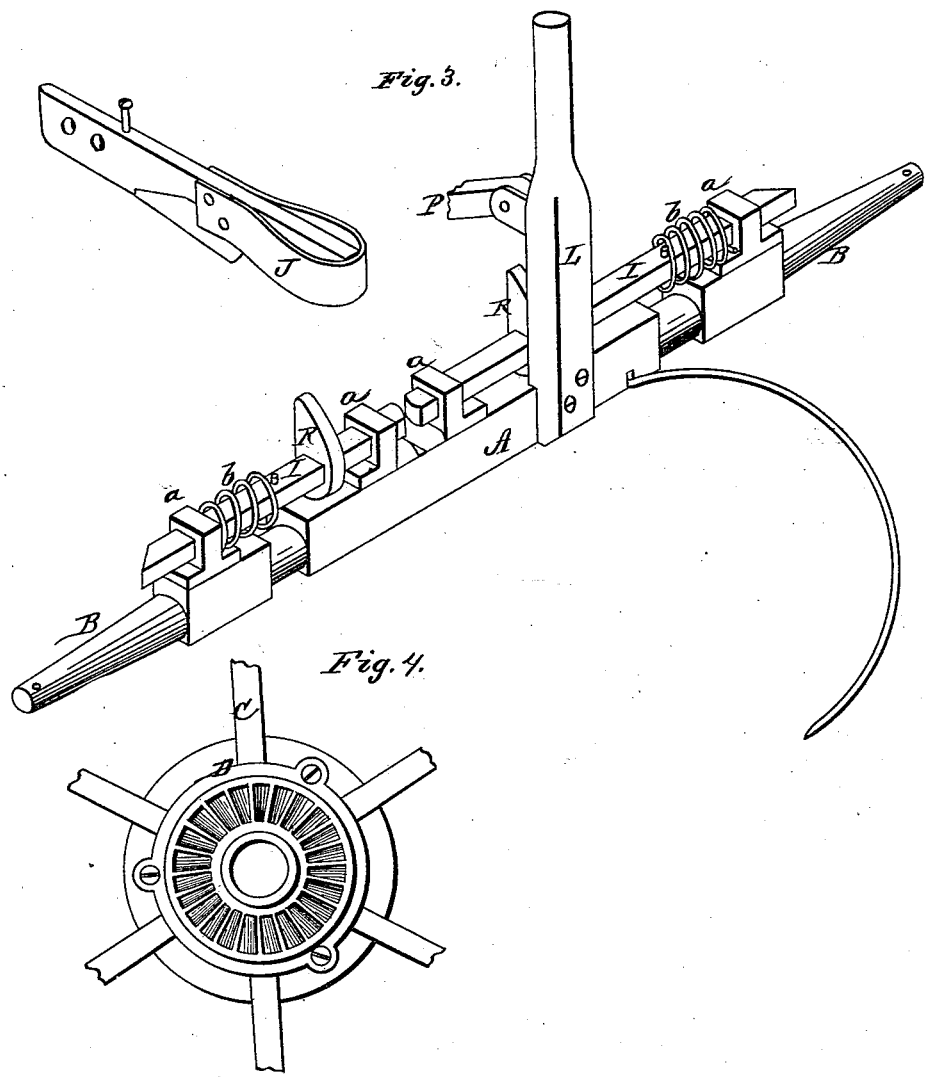

UNITED STATES PATENT OFFICE.

JAMES HOLLINGSWORTH, OF CHICAGO, ILLINOIS.

IMPROVEMENT IN HORSE HAY-RAKES.

Specification forming part of Letters Patent No. 167,533, dated September 7, 1875; application filed March 6, 1875.

*To all whom it may concern:*

Be it known that I, JAMES HOLLINGSWORTH, of Chicago, in the county of Cook and in the State of Illinois, have invented certain new and useful Improvements in Hay-Rakes; and do hereby declare that the following is a full, clear, and exact description thereof, reference being had to the accompanying drawings and to the letters of reference marked thereon, making a part of this specification.

The nature of my invention consists in the construction and arrangement of devices for dumping a horse hay-rake, as will be hereinafter more fully set forth.

In order to enable others skilled in the art to which my invention appertains to make and use the same, I will now proceed to describe its construction and operation, referring to the annexed drawings, in which—

Figure 1:
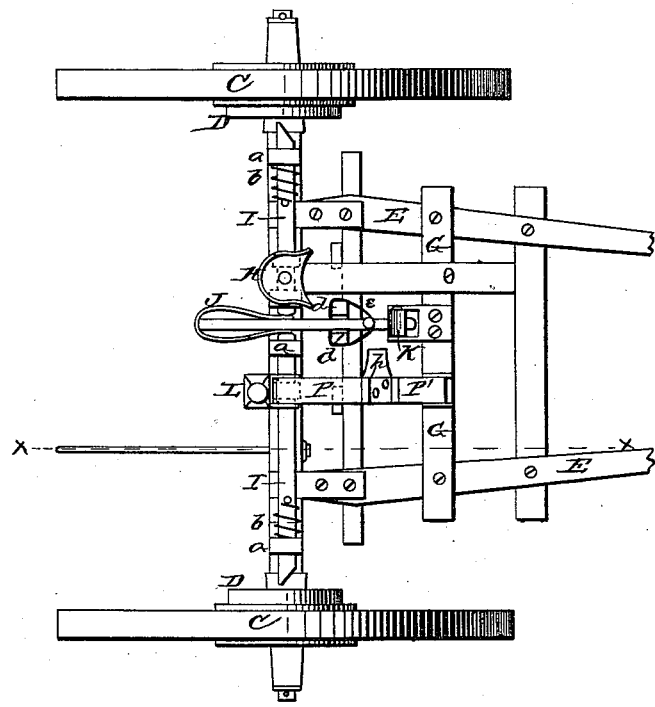
Figure 2:
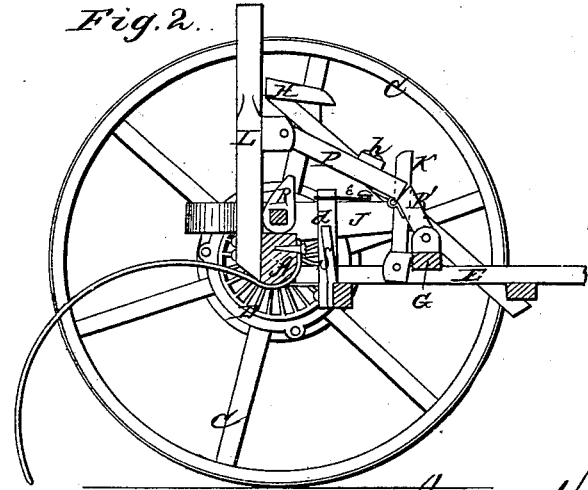

Figure 1 is a plan view of a horse hay-rake embodying my invention. Fig. 2 is a transverse vertical section of the same through the line $x\ x$ of Fig. 1. Fig. 3 is an enlarged perspective view of the rake-head with the devices attached thereto. Fig. 4 is a view of the inner side of one of the driving-wheels.

A represents the rake-head, provided at each end with a spindle, B, for the reception of a driving-wheel, C. On the inner side of each wheel is secured a ratchet-wheel, D, as shown in Fig. 4. E E represent the shafts, hinged at their rear ends, by strap-hinges, to rounded portions of the axle-tree or rake-head A, or connected thereto in any suitable manner. The shafts E E are connected by the ordinary cross-bars, and a platform, G, placed on top of them. H is the driver's seat, supported from the platform G. On top of the rake-head A are two sliding bars, I I, arranged in rigid bearings $a\ a$, the outer ends of which bars are beveled on the front side, so as to present suitable points to enter the ratchet-wheels D. The bars I I are provided with springs $b\ b$ to hold them away from the ratchet-wheels, as they would have a tendency to slide into contact by the jar or shaking of the rake. The bars I I are thrown outward, to be caught and acted upon by a wedge-shaped drag-bar, J, which passes between upright guides $d\ d$, and the front end pivoted to a lever, K, hinged at its lower end to the platform G. This lever is at such a distance from the driver's seat H that the driver can at any time place his foot thereon and press it forward, thereby pulling the drag-bar J also forward, so that its wedge-shaped rear end will push the bars I I outward, causing their outer pointed ends to be caught in the ratchet-wheels D, and, as the rake continues to move forward, the rake-head is turned over, discharging the gathered load. As soon as the pressure is removed from the foot-lever K a spring, $e$, throws the wedge-shaped drag-bar J back again into its original position. This spring may be in the form of an ordinary rubber band encircling a stud or pin on the drag-bar, and one or more stationary studs or pins, as shown in the drawing. Each shaft or bar I is provided with an arm, R, to strike and rub against cams S on the frame or platform when the rake-head is turned forward to discharge the load, whereby the bars I are drawn from gear or contact with the ratchet-wheels, allowing the rake to fall back in its proper position for work. From the rake-head A extends a lever, L, connected with the platform G by a jointed arm, P P', hinged or pivoted to the lever and platform, as shown in Fig. 2. The joint in the arm P P' is made in such a manner that when the arm is extended to its full length it will form an elbow at the joint, and the joint will break upward. On the upper part P of the arm is a projecting foot-piece, $h$, as shown, for the driver to place his foot on. The jointed arm P P', with foot-piece $h$ and the lever L, assist in discharging the gathered load with the foot as well as the hand. This device is specially of value on a hand discharging-rake, more so than on one which is discharged by the power of the horse. On a horse discharging-rake it holds the teeth to their work. The arm P P', being hinged to the platform at one end and to the lever or rake-head at the other end, and knuckling or elbowing forward and upward, brings the foot-piece $h$ just where the operator has the greatest amount of power, and the easiest applied.

In the lever devices where the joint elbows downward the operator generally has two foot-pieces—one to hold the teeth down and one to assist in raising, and he has to move his foot and almost rise from his seat to throw his weight on the lever.

With my invention this difficulty is obviated, as the operator can exert all the power necessary without altering his position on the seat.

Having thus fully described my invention, what I claim as new, and desire to secure by Letters Patent, is—

The wedge-shaped bar J, connected to the foot-lever, and provided with a retracting-spring, in combination with the sliding bars I I and oscillating rake-head A, substantially as and for the purposes herein set forth.

In testimony that I claim the foregoing I have hereunto set my hand this 1st day of March, 1875.

JAMES HOLLINGSWORTH.

Witnesses:
   LAWRENCE LEEINDECKER,
   H. THOMPSON.